United States Patent [19]

Kondo

[11] Patent Number: 5,066,850
[45] Date of Patent: * Nov. 19, 1991

[54] SOLDERING APPARATUS OF A REFLOW TYPE

[75] Inventor: Kenshi Kondo, Tokyo, Japan

[73] Assignee: Nihon Den-Netsu Keiki Co., Ltd., Tokyo, Japan

[*] Notice: The portion of the term of this patent subsequent to Jul. 3, 2007 has been disclaimed.

[21] Appl. No.: 416,456

[22] Filed: Oct. 3, 1989

[30] Foreign Application Priority Data

Oct. 4, 1988 [JP] Japan .................... 63-249053

[51] Int. Cl.⁵ .................... F27B 9/24; B23K 1/005
[52] U.S. Cl. .................... 219/388; 228/180.1; 392/360; 432/128
[58] Field of Search .................... 219/388, 400, 373; 432/245, 209, 239, 72, 225; 34/225, 105, 219, 12 H, 223; 228/47, 232

[56] References Cited

U.S. PATENT DOCUMENTS

| 1,949,716 | 3/1934 | Harsch | 34/223 |
| 4,938,410 | 7/1990 | Kondo | 228/180.1 |

FOREIGN PATENT DOCUMENTS

| 325451 | 7/1989 | European Pat. Off. |
| 2928156 | 4/1981 | Fed. Rep. of Germany |
| 3413109 | 10/1985 | Fed. Rep. of Germany |
| 2181378 | 4/1987 | United Kingdom |

OTHER PUBLICATIONS

*Journal of Electronic Engineering*, vol. 25, No. 262, Oct. 1988; pp. 46–48; S. Takazawa, "Innovations in Soldering Equipment and Technology".

*Feinwerktechnik & Messtechnik*, vol. 97, No. 5, May 1989, pp. 215–217, E. J. Duhm, "Infrarot-Reflow-Loten in der SMD-Technik".

*Primary Examiner*—Teresa J. Walberg
*Assistant Examiner*—Tuan Vinh To
*Attorney, Agent, or Firm*—Stephen F. K. Yee

[57] ABSTRACT

A soldering apparatus of a reflow type contains a preheating chamber and a reflow chamber which are provided with a plurality of heaters for heating printed circuit boards with chips temporarily mounted thereon with solder pastes during conveyance by a conveyor. The heaters are mounted on the side walls of the chamber, extending along a direction of conveyance of the printed circuit boards. The chambers are also provided with a screening member respectively so as to prevent direct radiation of radiant heat from the heaters into the chambers and onto the printed circuit boards and to provide a uniform air flow so as to be blown uniformly onto the printed circuit boards.

3 Claims, 4 Drawing Sheets

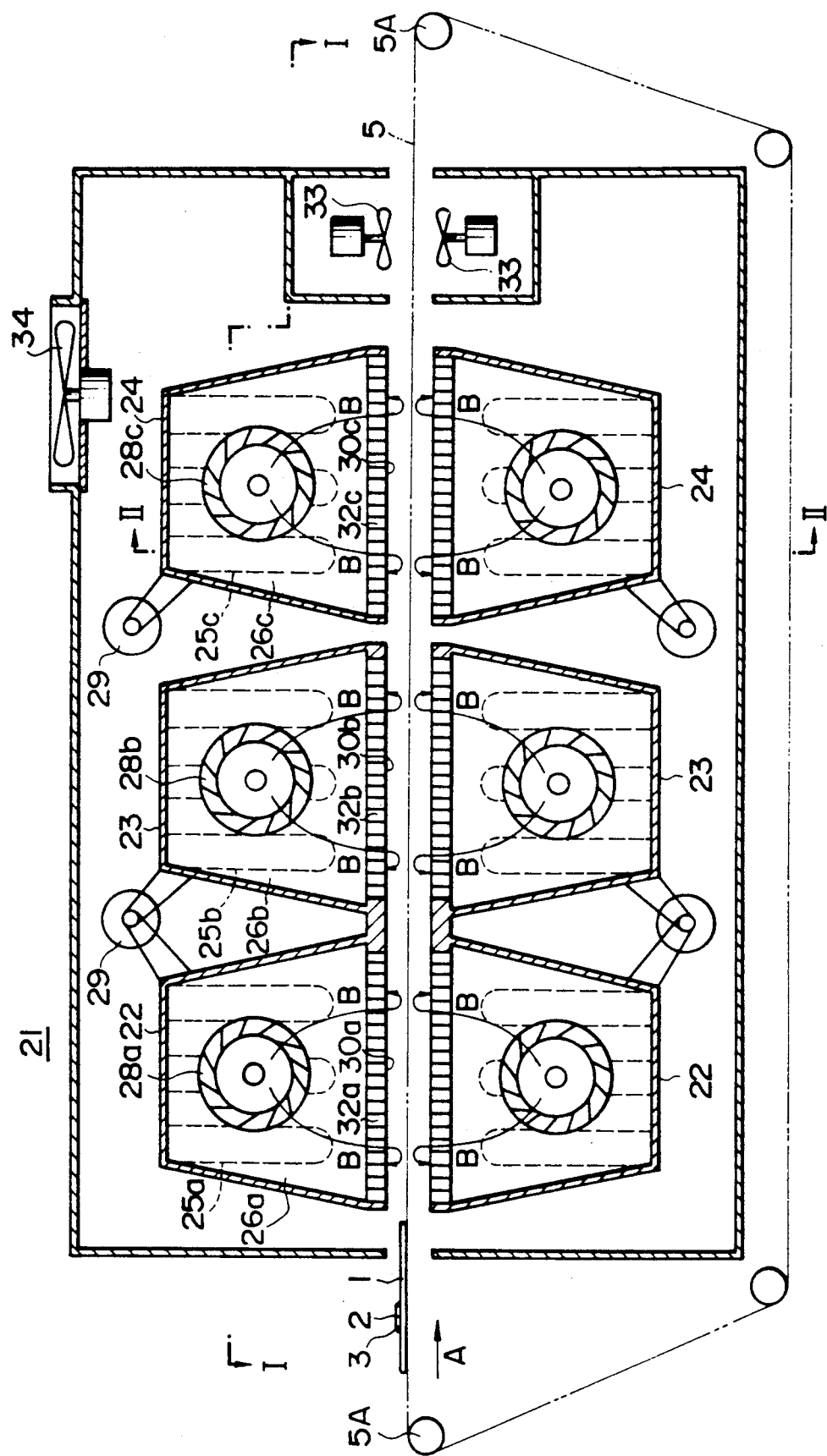

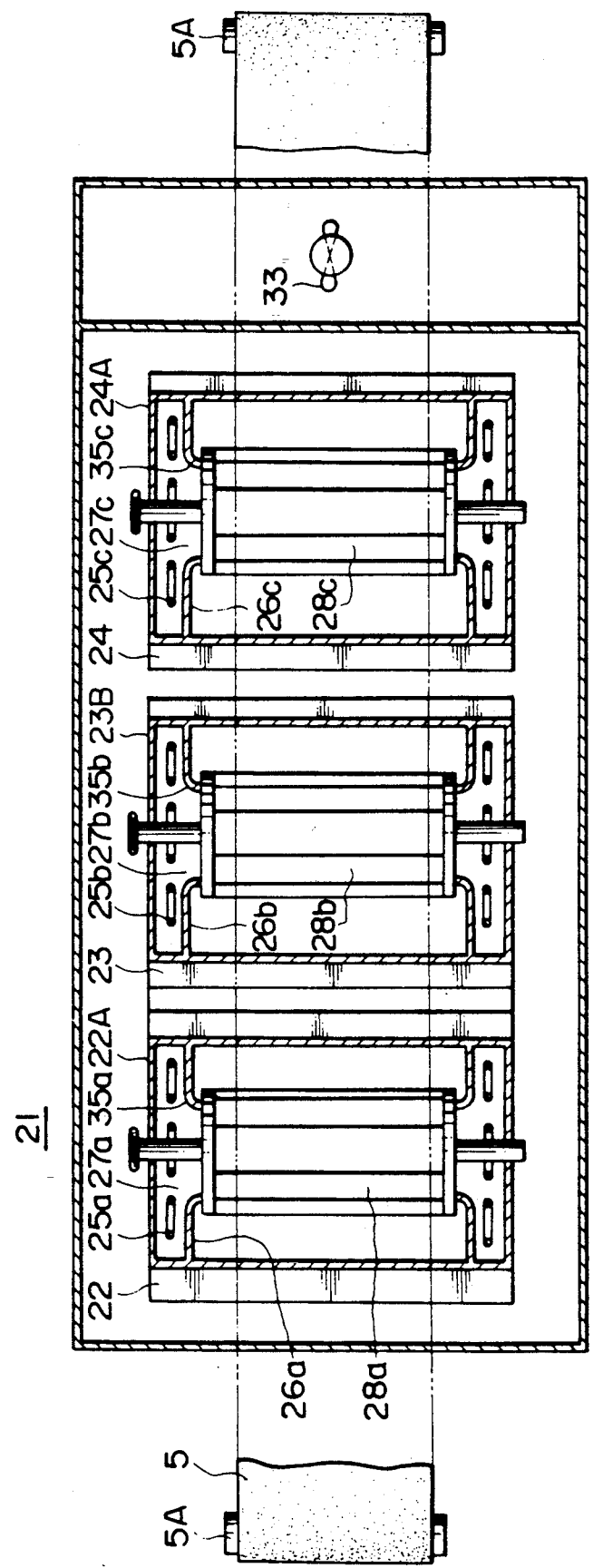

FIG. I(c)
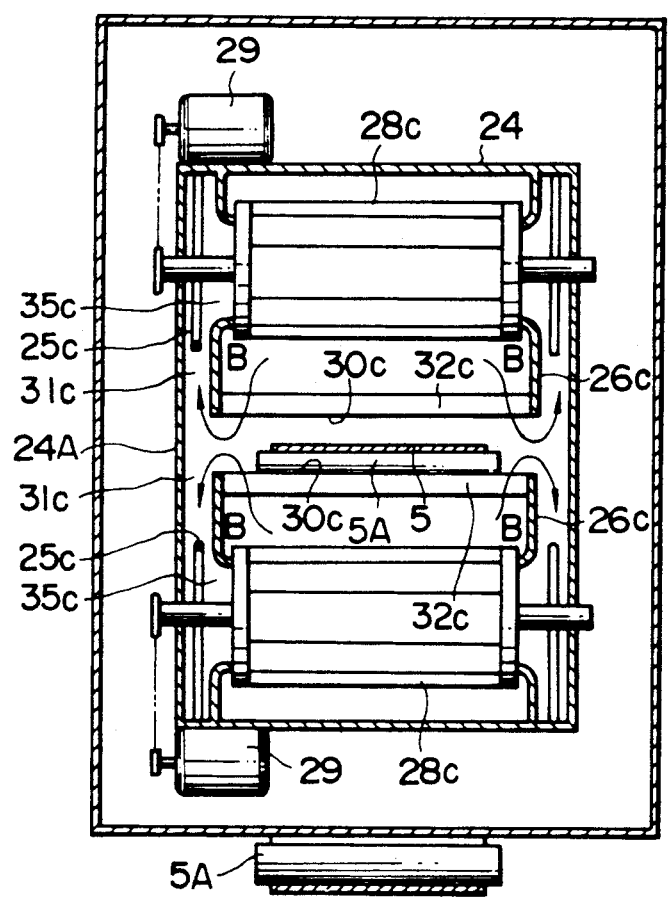

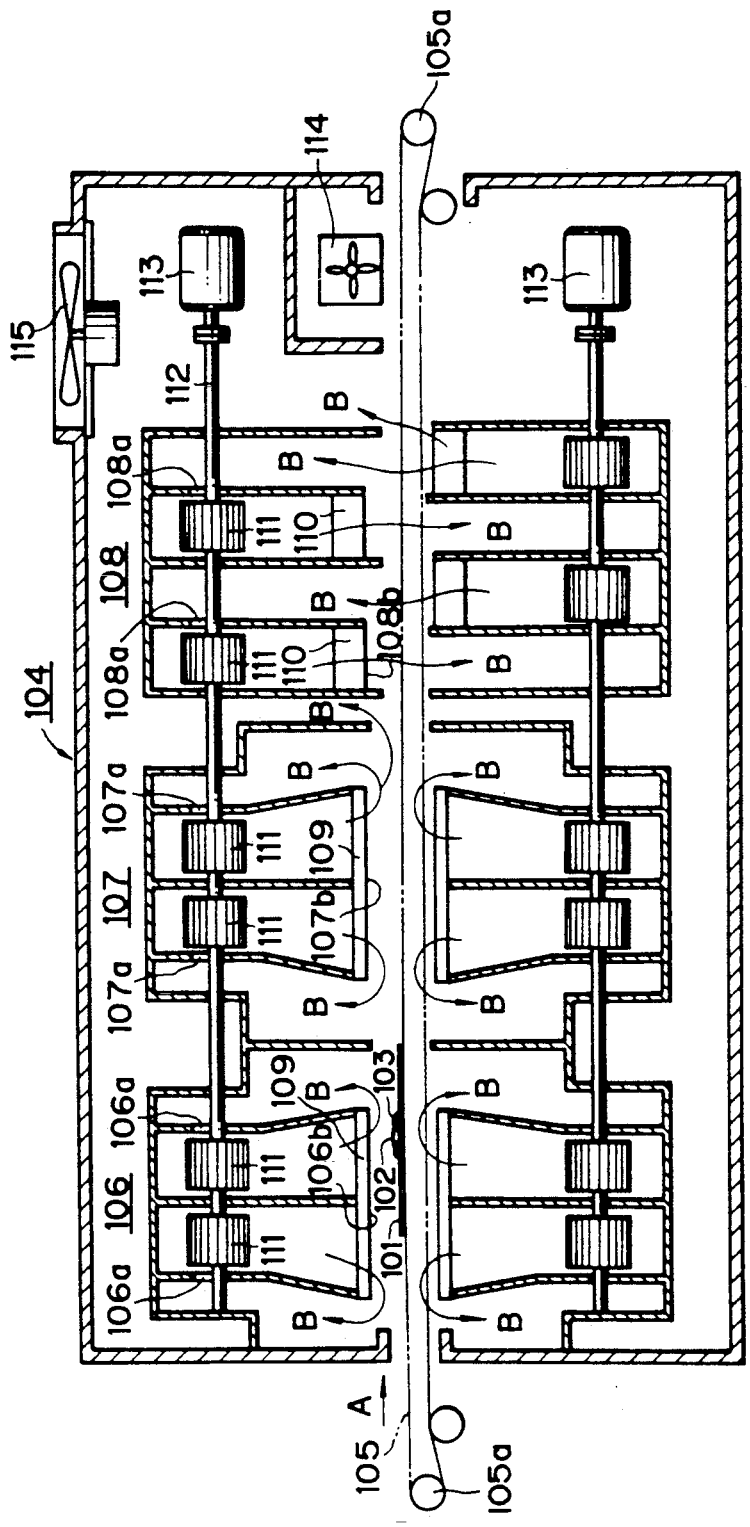

SOLDERING APPARATUS OF A REFLOW TYPE

BACKGROUND OF THE INVENTION

The present invention relates to a soldering apparatus of a reflow type and, more particularly, to a soldering apparatus of a reflow type in which electric parts such as chips, temporarily mounted on a printed circuit board are, soldered with solder preforms or solder pastes in a reflow chamber of the soldering apparatus after preheating them in a preheating chamber thereof.

A conventional soldering apparatus of the reflow type is arranged in which printed circuit boards on which chips have been temporarily mounted with solder preforms, solder pastes or adhesives are then exposed to heated air or far infrared rays to fuse or melt the solder preforms or the like, thus soldering the chips on the printed circuit boards.

One conventional soldering apparatus of the reflow type is shown in FIG. 2 in which printed circuit boards 101 with chips 102 temporarily mounted thereon with solder pastes 103 are placed on a belt conveyor 105 of a metal net or mesh being driven by rollers 105a in a direction shown by the arrow A. The soldering apparatus 104 is provided with a first preheating chamber 106 and a second preheating chamber 107 at postions along the direction of conveyance of the belt conveyor 105 and symmetrically and vertically interposing the belt conveyor 105. The first and second preheating chambers 106 and 107 are provided each with an air inlet 106a and 107a and a discharge outlet 106b and 107b, respectively. Air is sucked into the chambers 106 and 107 through the air inlets 106a and 107a, respectively, and the air is heated with a heater 109, such as a sheathed heater or a far infrared rays heater, mounted at the respective discharge outlets 106b and 107b, to temperatures as high as approximately 140° C., for example, below the fusion point of the solder pastes 103 or the like, thus preheating the printed circuit boards 101 being conveyed in the chambers 106 and 107. The preheated printed circuit boards 101 are then conveyed to a reflow chamber 108 in the soldering apparatus 104, which is provided at a discharge exit 108b thereof with a heater 110, such as a sheathed heater or far infrared rays heater. The printed circuit boards 101 are in turn heated with air sucked from an air inlet 108a by the heater 110 at temperatures as high as 215° C., at the fusion point of the solder pastes or the like or higher, thus soldering the chips 102 on the printed circuit boards 101. The heated air is discharged through the discharge outlet 108b. The preheating chambers 106 and 107 and the reflow chamber 108 are further provided each with a fan 111 which is connected through a rotary shaft 112 to each other and to a motor 113. The fans 111 then ventilate heated air in and from the chambers in a direction shown by the arrow B. The soldering apparatus 104 is also provided with a cooling fan 114 for cooling the fused or melted solder pastes 103 to solidify them and ensuring the fixed mounting of the chips 102 to the printed circuit boards 101, and an discharge fan 115 for discharging air inside the soldering apparatus 104.

The heater 109 or 110, such as a sheathed heater or a far infrared rays heater, generates radiant that containing far infrared rays which have the advantage that they are likely to heat even the inside of the chips 102 as compared with a heating system applying a thermal conduction of heated air. It is to be noted, however, that, as the solder pastes 103 have a larger reflectance than the chips 102, the far infrared rays require a longer time for heating the solder pastes 103 than for heating the chips 102, whereby the chips 102 are heated earlier than the solder pastes 103. Consequently, the chips 102 are likely to be damaged.

The heating system using the heater 109 or 110 is more difficult in setting heating requirements than the heating system using heated air because there are many varieties in kinds of printed circuit boards 101 and their sizes.

Furthermore, when a reflecting plate is provided for reflecting heat from the heater 109, 110, the reflecting surface may be coated with flux scattered from the solder pastes 103, worsening the thermal efficiency of the heaters 109, 110.

Accordingly, it is required to block from the printed circuit boards 101 radiant heat including for infrared rays generated from the heater 109, 110.

SUMMARY OF THE INVENTION

Therefore, the present invention has an object to provide a soldering apparatus of a reflow type capable of blocking radiant heat, including far infrared rays generated by the heaters and as a consequence removing the impact of radiant heat upon printed circuit boards due to far infrared rays, thus preheating the printed circuit boards as a whole at uniform temperatures in the preheating chambers and fusing the solder paste in uniform manner in the reflow chamber.

In order to achieve the object, the present invention is directed to the soldering apparatus of the reflow type consisting of a conveyor means for conveying a printed circuit board on which a chip is temporarily mounted with a solder paste, a preheating chamber for preheating the printed circuit board, a reflow chamber for soldering the chip on the printed circuit board by fusion of the solder paste, and a fan for ventilating air in each of the chambers, which comprises a heater mounted on a side wall of the preheating chamber for heating air therein, said side wall extending along the direction of conveyance of the printed circuit board; a heater mounted on a side wall of the reflow chamber for heating air therein, said side wall extending along the direction of conveyance of the printed circuit board; a screening member mounted adjacent the heater in each of the preheating chamber and the reflow chamber so as to prevent direct radiation of radiant heat into each of the chambers and to the printed circuit board; and an air inlet and an air outlet disposed each in the preheating chamber and the reflow chamber for circulating air heated by the heater in the preheating chamber and in the reflow chamber. Furthermore, the soldering apparatus may be provided with a flow transforming member in the preheating chamber or chambers and in the reflow chamber in order to heat the printed circuit boards in uniform manner by transforming a turbulent flow of heated air into a laminar flow.

With this arrangement, the radiant heat generated from the heaters can be blocked, preventing the heating of the printed circuit boards by the radiant heat. Furthermore, the air heated in the preheating chamber and in a the reflow chamber is blown to the printed circuit boards as a whole in uniform manner by allowing the heated air to pass through the air flow transforming member as a laminar flow, in addition to forcible circulation of the heated air by rotation of the ventilating fans.

BRIEF DESCRIPTION OF THE DRAWINGS

FIG. 1(a) is a cross-sectional side view showing one example of the soldering apparatus according to the present invention.

FIG. 2(b) is a cross-sectional view taken along the line I—I of FIG. 1(a).

FIG. 1(c) is a cross-sectional view taken along the line II—II of FIG. 1(a).

FIG. 2 is a cross-sectional side view showing a conventional soldering apparatus.

DETAILED DESCRIPTION OF THE PREFERRED EMBODIMENT

Referring to FIGS. 1 (FIG. 1(a) to FIG. 1(c)), a soldering apparatus 21 of the reflow type as a preferred embodiment of the soldering apparatus according to the present invention is shown to comprise a first preheating chamber 22, a second preheating chamber 23, and a reflow chamber 24, each of the first and second preheating chambers 22 and 23 and the reflow chamber 24 being symmetrically disposed so as to vertically interpose a belt conveyor 5 of a metal net or mesh being driven through rollers 5A. And the first preheating chamber 22 is disposed at a position upstream of the second preheating chamber 23 with respect to a belt conveyor 5, and the reflow chamber 24 is disposed at a position downstream of the second preheating chamber 23 with respect thereto. This arrangment permits the heating of a printed circuit board 1, on which a chip 2 is temporarily mounted and with a solder paste 3 in order during horizontal movement of the belt conveyor 5 that conveys the printed circuit board 1 in the direction indicated by the arrow A.

The conveyor means may be a conveyor chain with holding claws for holding printed circuit boards.

The first preheating chamber 22 is provided with a heater 25a, such as a sheathed heater, far infrared rays heater or the like, on a side wall 22A which extends along the conveying direction of the printed circuit board 1, namely along the direction indicated by the arrow A, and air therein is heated at approximately 160° C. for heating the printed circuit boards 1 to rapidly raise temperatures approximately 140° C., below the fusion point of the solder paste 3. The first preheating chamber 22 is further provided with a screening plate 26a, for example, of a metal plate, in parallel to an inner surface of the side wall 22A so as to block radiation of radiant heat containing far infrared rays generated by the heater 25a into the first preheating chamber 22.

The screening plate 26a forms a heating sub-chamber 27a in association with the side wall 22A on which the heater 25a is mounted and the provision of the screening plate 26a prevents radiant heat from radiating directly onto the printed circuit boards 1 with the chips 2 mounted thereon.

On the first preheating chamber 22 is mounted a ventilating fan 28a for circulating the heated air in the chamber, such as a multiblade fan or the like, and a flow passage 35a is provided for communicating the heating sub-chamber 27a with the inside of the ventilating fan 28a, through which the air heated in the heating sub-chamber 27a by the heater 25a is passed into the ventilating fan 28a operated by a motor 29 so that the heated air is circulated in the first preheating chamber 22.

The first preheating chamber 22 is provided with an air outlet 30a at a lower end thereof, and the air outlet 30a in turn is provided with an flow transforming plate 32a at a position adjacent to the passage along which the printed circuit board 1 with the chips 2 is conveyed. The air flow transforming plate 32 a serves as transform a turbulent flow in the chamber into a laminar flow. The heated air withdrawn from the first preheating chamber 22 through the air flow transforming plate 32a is caused to flow as a laminar flow in a direction as shown by the arrow B and is blown uniformly onto the printed circuit boards 1 conveyed by the belt conveyor 5. Although the heater 25a is mounted on the side wall 22A of the chamber in this example, it may be mounted on any other appropriate position within the heating sub-chamber 27a.

The second preheating chamber 23 has substantially the same structure as described immediately hereinabove for the first preheating chamber 22. As shown in FIG. 1, identical elements are provided with identical reference numerals to which the reference symbol "b" is added. More specifically, for example, the second preheating chamber 23 is likewise provided with a heater 25b for heating air therein at temperatures as high as 140° C. so as to heat the printed circuit boards 1 and maintain them at 140° C. in a stable manner while they are conveyed by the belt conveyor 5.

The printed circuit boards 1 are then conveyed to the reflow chamber 24 which in turn has substantially the same structure as the first preheating chamber 22 in which identical elements are provided with identical reference numeral with a reference symbol "c 38 after the reference numeral.

The air heated in the heating sub-chambers 27a, 27b, and 27 c of the preheating chambers 22 and 23 and the reflow chamber 24 is introduced through the flow passage 35 therefrom to the ventilating fans 28a, 28b, and 28c, respectively, and blowm by them onto the printed circuit boards 1 in the direction as shown by the arrow B. More specifically, the heated air withdrawn through the air flow transforming plates 32a, 32b, and 32 c at the air outlets 30a, 30b, and 30c is allowed to rise in the soldering apparatus 21 for circulation and then sucked again through air inlets 31a, 31b, and 31c defined at both side portions in the widthwise direction, perpendicular to the conveying direction (indicated by the arrow A) of the printed circuit boards 1, into the heating sub-chambers 27a, 27b, and 27c, respectively.The passage of the heated air, in the form of a turbulent flow caused by the fans 28a, 28b, and 28c, becomes a laminar flow after passing through the flow transforming plates 32a, 32band 32c, thus flowing in a uniform manner and as a consequence heating the printed circuit board 1 uniformly in a widthwise direction of the printed circuit board 1.

The uniform heating of the printed circuit board 1 in the widthwise direction in the respective first preheating chambers 22 and 23 and in the reflow chamber 24, respectively, permits a uniform fusion of the solder pastes 3 causing no irregularity on soldering and providing printed circuit boards 1 of higher quality.

The printed circuit boards 1 with the chips 2 soldered thereon are then conveyed out of the reflow chamber 24 and colled by a cooling fan 33.

Exhaust air and gases in the soldering apparatus 21 are withdrawn by an exhaust fan 34 mounted on an upper wall of the soldering apparatus 21.

In this embodiment, since the heating sub-chambers 27a, 27b, and 27c are formed along both side walls 22A, 23A, and 24A arranged in the conveying direction of the printed circuit boards 1 (indicated by the arrow A), as mentioned above, the printed circuit boards may be heated only by the air heated by the heaters 25a, and 25b and 25c without direct heating due to radiation of radiant heat containing far infrared rays generated by the heaters 25a, 25b, and 25c. Therefore, damages to the chips due to the radiant heat can be effectively prevented.

Further, in this embodiment, since no direct radiant heat from the heater 25 is used any more so that it will take a longer time to fuse or melt the solder pastes 3; however, this may be shortened by an increase in the flow velocity of the heated air.

Still further, in the above preferred embodiment, although the soldering apparatus comprises a pair of similarly constructed upper and lower first preheating chambers, a pair of similarly constructed upper and lower second preheating chambers and a pair of similarly constructed upper and lower reflow chambers, either one of the upper and lower chambers may be omitted if desired.

In accordance with an aspect of the present invention, the soldering apparatus of the reflow type with the arrangement as described above is provided with the heaters each on side walls of the preheating chambers and of the reflow chamber extending along the conveying direction of the printed circuit board, for heating air therein and with screening plates adjacent to the heaters in order to prevent radiation of radiant heat from the heaters into the preheating chambers and the reflow chamber. Furthermore, the preheating chambers and the reflow chamber of the soldering apparatus are provided each with the air inlet and the air outlet in order to allow the heated air to be circulated in the chamber with the ventilating fan. With the arrangenment of the soldering apparatus according to the present invention, the printed circuit boards and chips are heated only by the heated air, so that such arrangement can prevent damages of chips due to direct heating by radiant heat to be otherwise caused by a fusion of the solder pastes prior to the heating of the printed circuit boards, thereby providing printed circuit boards with chips of higher quality annd permitting an easy adjustment of temperatures in the chambers because of the air in the chambers being heated by the heaters mounted within the chambers. Thus productivity is improved to a greater extent.

What is claimed is:

1. In a reflow type soldering apparatus having a conveyor means for conveying through the apparatus a printed circuit board on which a chip is temporarily mounted with a solder paste, a preheating chamber for preheating the printed circuit board, a reflow chamber for achieving soldering of the chip on the printed circuit board by fusion of the solder paste, and a fan in each of the chambers for circulating air through each respective chamber, the improvement comprising:

a first heater mounted adjacent to a side wall of the preheating chamber, said side wall of the preheating chamber extending along the direction of conveyance of the printed circuit board;

a first screening member mounted adjacent to said first heater so as to prevent direct radiation of radiant heat into the preheating chamber and to the printed circuit board, said first screening member defining with said preheating chamber side wall a first heating subchamber for heating air therein;

a second heater mounted adjacent to a side wall of the reflow chamber, said side wall of the reflow chamber extending along the direction of conveyance of the printed circuit board;

a second screening member mounted adjacent to said second heater so as to prevent direction radiation of radiant heat into the reflow chamber and to the printed circuit board; said second screening member defining with said reflow chamber side wall a second heating subchamber for heating air therein;

a first air inlet and a first air outlet disposed in said preheating chamber to permit circulation of heated air in said preheating chamber, said first inlet directing air through said first heating subchamber and to the circulating fan in said preheating chamber, and said first outlet directing heated air toward said conveyor means to preheat said printed circuit boards;

a second air inlet and a second air outlet dispoed in said reflow chamber to permit circulation of heated air in said reflow chamber, said second inlet directing air through said second heating subchamber and to the circulating fan in said reflow chamber, and said second outlet directing heated air toward said conveyor means to heat and fuse the solder paste; and an air flow transforming member provided in each of said first and second air outlets, downstream of each of said ciruclating fans, to provide a uniform flow of non-turbulent heated air toward said conveyor means, the fan and air flow transforming member in each of said preheating and said reflow chamber being disposed to direct non-turbulent heated air substantially evenly and uniformly across the width of said conveyor means to evenly heat the printed circuit board across the width of the board.

2. The reflow type soldering apparatus of claim 1 wherein said preheating chamber further comprises:

a first heating subchamber disposed on each side of said conveyor means;

a first air inlet for directing air to each of said first heating subchambers;

a first heater disposed in each of said first heating subchambers for heating air therein; and said fan in the preheating chamber being disposed substantially transversely with respect to the direction of movement of said conveyor means, to direct heated air substantially evenly and uniformly across said conveyor means.

3. The reflow type soldering apparatus of claim 2, wherein said reflow chamber further comprises:

a second heating subchamber disposed on each side of said conveyor means;

a second air inlet for directing air to each of said second heating subchambers;

a second heater disposed in each of said second heating subchambers for heating air therein; and said fan in the reflow chamber being disposed substantially transversely with respect to the direction of movement of said conveyor means, to direct heated air substantially evenly and uniformly across said conveyor means.

* * * * *